(12) United States Patent
Daun et al.

(10) Patent No.: US 9,065,735 B1
(45) Date of Patent: Jun. 23, 2015

(54) MEASURING UPSTREAM MODULATION ERROR RATIO

(71) Applicant: ARRIS Enterprises, Inc., Suwanee, GA (US)

(72) Inventors: Carl L. Daun, Oak Park, IL (US); Lawrence C. Spaete, Jr., Naperville, IL (US); Ayham Al-Banna, Orland Park, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 14/248,938

(22) Filed: Apr. 9, 2014

(51) Int. Cl.
*H04B 3/46* (2006.01)
*H04B 17/00* (2006.01)
*H04Q 1/20* (2006.01)
*H04L 12/26* (2006.01)
*H04L 1/00* (2006.01)

(52) U.S. Cl.
CPC .......... *H04L 43/0823* (2013.01); *H04L 1/0017* (2013.01); *H04L 43/04* (2013.01)

(58) Field of Classification Search
CPC ............. H04B 17/0055; H04B 17/006; H04L 43/0823; H04L 1/0017; H04L 43/04
USPC ......................................................... 375/227
See application file for complete search history.

(56) References Cited

U.S. PATENT DOCUMENTS 5,867,539 A * 2/1999 Koslov ........................... 375/346
8,934,594 B1 * 1/2015 Malhotra ....................... 375/355

* cited by examiner

*Primary Examiner* — Tanmay Shah
(74) *Attorney, Agent, or Firm* — Bart A. Perkins (57) ABSTRACT

Methods, systems, and computer readable media can be operable to calculate modulation error ratio using feedback from error correction processing. An error correction value obtained through an error correction process can be added to a measured slicer error in order to calculate a modulation error ratio. An error correction value associated with a correctable error can be based upon the difference between a received symbol and a correct symbol. An error correction value associated with an uncorrectable error can be based upon a measured slicer error and the distance between constellation symbols in a constellation diagram.

20 Claims, 6 Drawing Sheets

MEASURING UPSTREAM MODULATION ERROR RATIO

TECHNICAL FIELD

This disclosure relates to measuring upstream modulation error ratio at a receiver.

BACKGROUND

Modulation error ratio (MER) is used as a measure of the signal to noise ratio (SNR) in many communications systems. In general, MER measurements are based on errors between received symbols and constellation symbols closest to those received symbols in an associated constellation diagram. The difference between a received symbol and a closest constellation symbol can be referred to as a slicer error.

Generally, MER can be calculated as the ratio of the energy of a target symbol to the energy of the error between the target symbol and a received symbol. For example, when the target symbol is the closest constellation symbol as described above, the MER can be calculated by dividing the energy of the closest constellation symbol by the energy of the slicer error.

An MER measurement can represent an approximation of the SNR in a communication system. However, the accuracy of an SNR approximation can be diminished when a received symbol is sliced incorrectly. For example, an MER measurement may not accurately reflect SNR where the closest constellation symbol to a received symbol is improperly identified as the target symbol in the MER measurement.

BRIEF DESCRIPTION OF THE DRAWINGS

Like reference numbers and designations in the various drawings indicate like elements.

DETAILED DESCRIPTION

Where an MER measurement is used to approximate the SNR in a communication system, inaccuracies can arise when the closest constellation symbol to a received symbol is improperly identified as the target symbol in the MER measurement. In embodiments of this disclosure, measured slicer errors associated with one or more received symbols are adjusted using feedback from error correction processing, thereby improving the accuracy of an MER calculation and the corresponding SNR approximation.

This disclosure describes methods, systems, and computer readable media operable to calculate modulation error ratio using feedback from error correction processing. As described in more detail below, an error correction value obtained through an error correction process can be added to a measured slicer error in order to calculate a modulation error ratio. An error correction value associated with a correctable error can be based upon the difference between a received symbol and a correct symbol. An error correction value associated with an uncorrectable error can be based upon a measured slicer error and the distance between constellation symbols in a constellation diagram.

Figure 1:
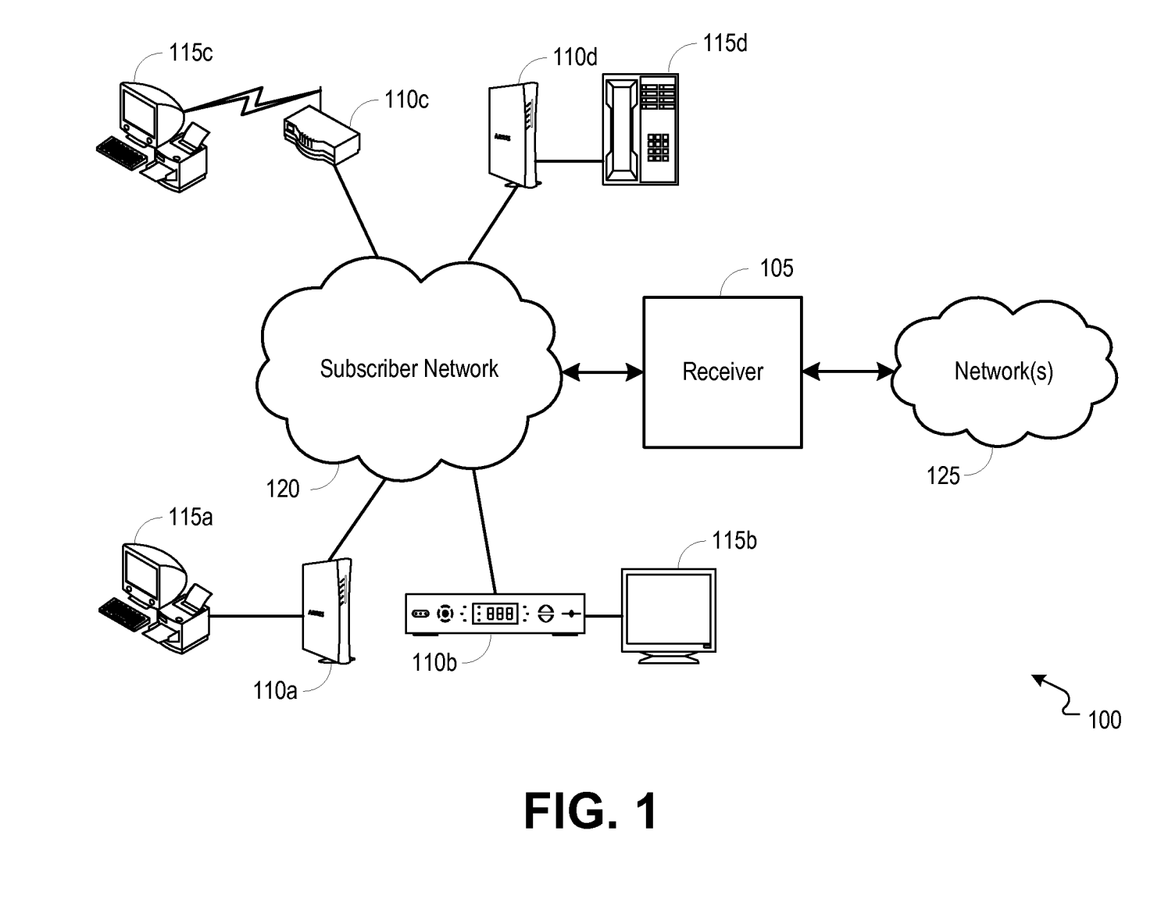
FIG. 1 is a block diagram illustrating an example network environment operable to calculate modulation error ratio using feedback from error correction processing.

FIG. 1 is a block diagram illustrating an example network environment 100 operable to calculate modulation error ratio at a receiver using feedback from forward error correction processing. In embodiments, a receiver 105 provides video service(s) and/or data service(s) to customer premise equipment (CPE) devices 110a-d in one or more subscriber groups (e.g., service group(s)). In embodiments, the receiver 105 is located at or within a cable modem termination system (CMTS).

The CPE devices 110a-d can include, for example, a cable modem 110a, a set-top box 110b, a wireless router including an embedded cable modem 110c, or a media terminal adapter (MTA) 110d, among many others (e.g., digital subscriber line (DSL) modem, voice over internet protocol (VOIP) terminal adapter, video game console, digital versatile disc (DVD) player, communications device, etc.). The CPE devices 110a-d can facilitate communications between the receiver 105 and client devices 115a-d. A cable modem or embedded MTA (eMTA) 110a can facilitate communications from the receiver 105 to a computer 115a. A set-top box 110b can facilitate communications from the receiver 105 to a television 115b or a digital video recorder (DVR). A wireless router 110c can facilitate wireless communications between a computer 115c and a receiver 105. An MTA 110d can facilitate communications between a telephone 115d and a receiver 105.

The CPE devices 110a-d can communicate with the receiver 105 via a subscriber network 120. A subscriber network 120 can include a hybrid fiber-coaxial network, a digital subscriber line network, a wireless local area network, a cellular or mobile network, a personal area network, and others. The receiver 105 can facilitate communications between one or more network(s) 125 and the CPE devices 110a-d. The network(s) 125 can include one or more networks internal to the receiver and/or one or more networks external to the receiver (e.g., one or more extranets, the Internet, etc.). The network(s) 125, for example, can operate using internet protocol (IP), sending data packets to and receiving data packets from the receiver 105. In further examples, one or more video sources may provide streaming data through the network(s) 125 to the receiver 105.

In embodiments, streaming data is sent in bursts from a subscriber network 120 and each burst is translated into QAM modulated symbols which the receiver 105 demodulates back into bursts of data. These bursts of data can be translated back into the original streaming data such that the streaming data can be passed to network(s) 125.

Traffic on an upstream channel may become degraded by upstream impairments existing on the upstream channel. A receiver 105 can be operable to calculate MER of a symbol and/or an average MER value of symbols measured over various signal components or durations (e.g., an average MER of a burst, channel, physical card, etc.). In embodiments, the calculated MER is used as an estimate of the SNR existing on a channel.

Figure 2:
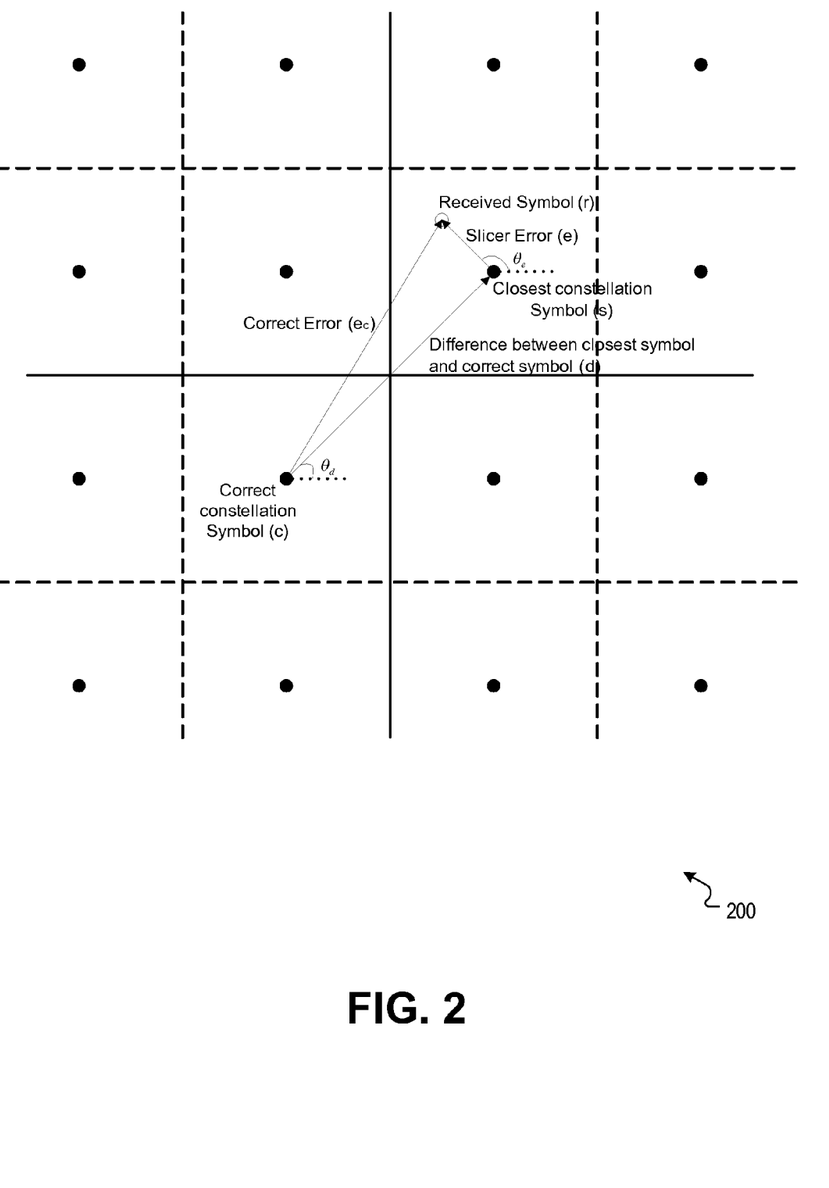
FIG. 2 is an illustration of an example constellation diagram showing the position of received symbol, a symbol closest to the received symbol, and a correct symbol, the correct symbol being adjacent to the symbol closest to the received symbol.

FIG. 2 is an illustration of an example constellation diagram 200 showing the position of a received symbol, a symbol closest to the received symbol, and a correct symbol, the correct symbol being adjacent to the symbol closest to the received symbol. In embodiments, a slicer error (e) is equivalent to the distance between the received symbol (r) and the closest constellation symbol (s) (e.g., the symbol within the constellation diagram that is closest to the received symbol (r)). In embodiments, a correct slicer error ($e_c$) is equivalent to the distance between the received symbol (r) and a correct constellation symbol (c). The correct slicer error ($e_c$) can be calculated using the slicer error (e) and the difference (d) between the correct symbol and the closest symbol to the received symbol.

In embodiments, MER associated with the received symbol (r) is calculated using the following equation (1), wherein s is the constellation symbol closest to the received symbol (e.g., closest constellation symbol (s)), and e is a slicer error (e.g., slicer error (e)).

$$MER = \frac{|s|^2}{|e|^2} \quad (1)$$

In embodiments, an average slicer error ($E_{avg}$) is calculated for a plurality of received symbols using the following equation (2), wherein $e_i$ is the slicer error associated with an $i^{th}$ symbol.

$$Eavg = \frac{1}{N}\sum_{i=1}^{N}|e_i|^2 \quad (2)$$

In embodiments, an average MER (MERavg) for a plurality of received symbols is calculated using the following equation (3), wherein $S_{avg}$ is the average energy of constellation symbols closest to the received symbols, and $E_{avg}$ is an average slicer error.

$$MERavg = \frac{Savg}{Eavg} \quad (3)$$

In embodiments, the difference between the correct slicer error ($e_c$) and the slicer error (e) of the constellation diagram 200 is calculated using the following equation (4), wherein d, $\theta_d$, and $\theta_e$ are equivalent to d, $\theta_d$, and $\theta_e$ of the constellation diagram 200. In embodiments, differences between correct slicer errors and corresponding slicer errors associated with a plurality of received symbols is averaged together, and this average error difference is added to an average slicer error (e.g., $E_{avg}$ of equation (2)) associated with the plurality of received symbols.

$$|e_c|^2 - |e|^2 = |d|^2 + 2|d||e|\cos(\theta_d - \theta_e) \quad (4)$$

Figure 3:
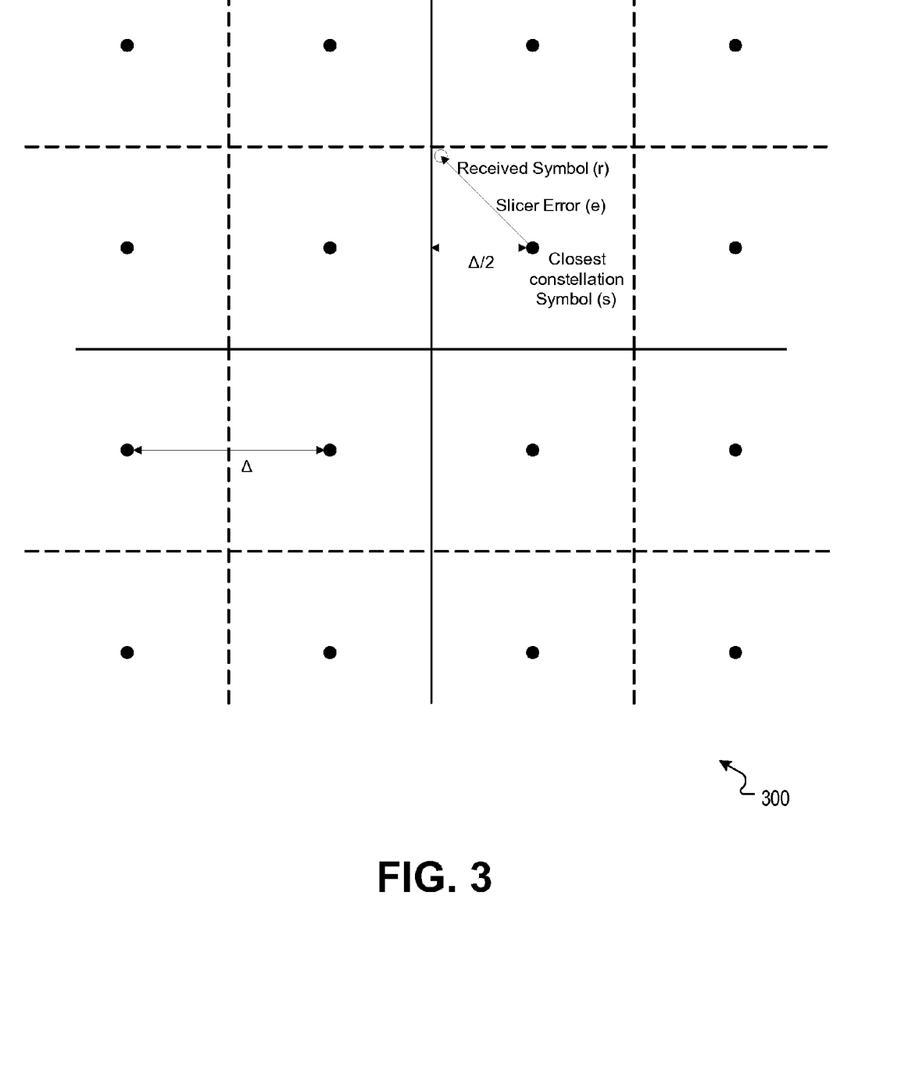
FIG. 3 is an illustration of an example constellation diagram showing a slicer error that is greater than half the distance between adjacent constellation symbols.

FIG. 3 is an illustration of an example constellation diagram 300 showing a slicer error that is greater than half the horizontal distance between adjacent constellation symbols. In embodiments, the difference between a received symbol (r) and the closest constellation symbol (s) (e.g., the difference being the slicer error (e)) is greater than half the distance (A) between adjacent constellation symbols within the constellation diagram 300.

Figure 4:
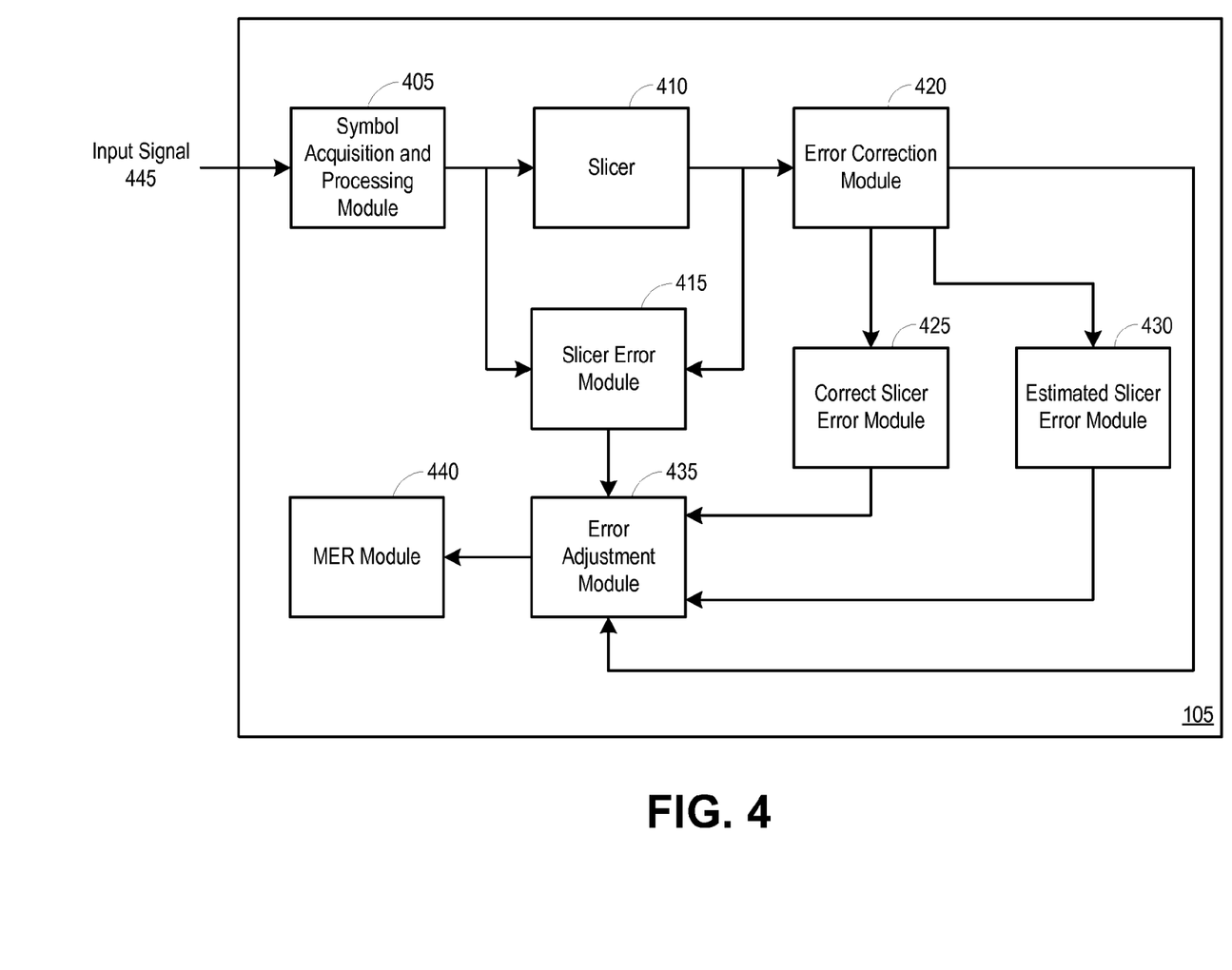
FIG. 4 is a block diagram illustrating an example receiver operable to calculate modulation error ratio using feedback from error correction processing.

FIG. 4 is a block diagram illustrating an example receiver 105 operable to calculate modulation error ratio using feedback from error correction processing. The receiver 105 can include a symbol acquisition and processing module 405, a slicer 410, a slicer error module 415, an error correction module 420, a correct slicer error module 425, an estimated slicer error module 430, an error adjustment module 435, and an MER module 440. In embodiments, the receiver 105 is located at or within a CMTS.

In embodiments, an input signal 445 is received by the receiver 105 from a client device (e.g., CPE devices 110a-d of FIG. 1) through a network (e.g., subscriber network 120 of FIG. 1). It should be understood that in various implementations, the input signal 445 is received by the receiver 105 through a local area network (LAN), wide area network (WAN), or other applicable network.

In embodiments, the input signal 445 passes through a symbol acquisition and processing module 405. The symbol acquisition and processing module 405 can process the input signal 445 and/or extract a received symbol (e.g., a QAM symbol based upon the amplitude and phase of a segment of the input signal 445) from within the input signal 445. For example, one or more received symbols can be extracted from a burst associated with the input signal 445. Processing the input signal 445 can include equalizing the input signal 445 and/or canceling ingress noise associated with the input signal 445. In embodiments, the symbol acquisition and processing module 405 outputs the received symbol to a slicer error module 415. In embodiments, the symbol acquisition and processing module 405 outputs the input signal 445 and the received symbol to a slicer 410.

In embodiments, a slicer 410 generates a sliced symbol associated with the received symbol. The slicer 410 can generate a sliced symbol using the received symbol and a QAM modulation order associated with the input signal 445. For example, the sliced symbol can be the constellation symbol (e.g., a symbol within a constellation diagram associated with the input signal 445) that is closest to the received symbol. In embodiments, a slicer 410 outputs the sliced symbol to a slicer error module 415. In embodiments, a slicer 410 outputs one or more received symbols and/or one or more sliced symbols to an error correction module 420.

In embodiments, a slicer error module 415 calculates a difference between a received symbol and a corresponding sliced symbol. For example, the slicer error module 415 can calculate a difference between coordinates associated with a constellation diagram (e.g., the difference between in-phase values and quadrature values associated with the received and sliced symbols). In embodiments, the slicer error module 415, based upon said calculated difference between coordinates, calculates a slicer error (e.g., an amount of energy associated with the difference between a received symbol and a corresponding sliced symbol) and an amount of energy associated with the corresponding sliced symbol. In embodiments, the slicer error module 415 outputs the slicer error to an error adjustment module 435. In embodiments, the energy associated with the sliced symbol is output to the error adjustment module 435 based upon an algorithm which is used to determine the energy of an average symbol.

In embodiments, an error correction module 420 collects one or more symbols (e.g., symbols collected from the output of slicer 410). In embodiments, the error correction module 420 identifies and attempts to correct errored symbols. For example, the error correction module 420 can operate on data and/or parity bits or bytes that are associated with the one or more symbols to identify and attempt to correct errors. In embodiments, the error correction module 420 determines whether a symbol has a translation error. For example, a symbol can have a translation error when the correct symbol (e.g., correct constellation symbol (c) of FIG. 2) associated with a received symbol (e.g., received symbol (r) of FIG. 2), is not the constellation symbol closest to the received symbol (e.g., closest constellation symbol (s) of FIG. 2). When the determination is made that a symbol does not have a translation error, the error correction module 420 can communicate to the error adjustment module 435 that no error adjustment, other than possibly an adjustment for a corresponding slicer error, is required for the symbol. When the determination is made that a symbol does have a translation error, the error correction module 420 can forward the symbol to either the correct slicer error module 425 or the estimated slicer error module 430.

In embodiments, the error correction module 420 determines whether one or more symbols within a group of symbols are correctable or uncorrectable (e.g., whether the group of symbols has a predetermined number of correctable or uncorrectable errored symbols). For example, the determination can be made that one or more symbols within a group of symbols are correctable where the number of errored symbols within the group of symbols is less than a maximum number of symbols that can be corrected.

In embodiments, where the determination is made that one or more symbols within the group of symbols are correctable, the error correction module 420 outputs the correctable symbols within the group of symbols to a correct slicer error module 425. In embodiments, where the determination is made that one or more symbols within the group of symbols are uncorrectable, the error correction module 420 outputs a number of uncorrectable symbols within the group of symbols to an estimated slicer error module 430.

In embodiments, a correct slicer error module 425 determines a correct symbol and calculates a correct slicer error for each correctable symbol within the group of symbols. A correct slicer error can be calculated by taking the difference between the received symbol and a correct constellation symbol corresponding with the received symbol. In embodiments, the correct constellation symbol is identified based upon a QAM modulation order associated with the input signal 445.

In embodiments, an estimated slicer error module 430 calculates an estimated slicer error for uncorrectable symbols within a group of symbols. A single estimated slicer error can be calculated for an uncorrectable group of symbols, and the single estimated slicer error can be applied to each of the uncorrectable symbols within the group of symbols. In embodiments, the distance between constellation symbols in a constellation diagram associated with a received symbol is used to calculate an estimated slicer error. In embodiments, an estimated slicer error is calculated based upon a number of received uncorrectable symbols within groups of symbols. The estimated slicer error module 430 can maintain a number of uncorrectable symbols within groups of symbols that are received by the estimated slicer error module 430 over a predetermined period of time (e.g., the estimated slicer error module 430 can temporarily and/or periodically store one or more counts of the number of uncorrectable symbols within groups of symbols received by the estimated slicer error module 430). In embodiments, when the ratio of uncorrectable symbols within groups of symbols to the total number of symbols within the groups of symbols over the predetermined period of time received by the estimated slicer error module 430 is less than a predetermined threshold value, the estimated slicer error for each symbol within the group of symbols is set to the greater of the slicer error associated with each symbol or half of the horizontal or vertical distance between two adjacent symbols in a constellation diagram. In embodiments, when the number of uncorrectable groups of symbols that are received by the estimated slicer error module 430 reaches and/or exceeds a predetermined threshold during a predetermined period of time, the estimated slicer error for each symbol within the group of symbols is set to the greater of the slicer error associated with the symbol or a constant multiplied by half of the horizontal or vertical distance between two adjacent symbols in a constellation diagram.

In embodiments, the error adjustment module 435 receives notifications from an error correction module 420 that a symbol is free of translation errors, receives correct slicer errors and estimated slicer errors from a correct slicer error module 425 or estimated slicer error module 430, and receives corresponding slicer errors from a slicer error module 415. The error adjustment module 435 can calculate one or more error correction values by taking the difference between correct slicer errors or estimated slicer errors and corresponding slicer errors. The error adjustment module 435 can calculate an average error correction value by summing together error correction values and dividing the error correction value sum by the number of received symbols (e.g., the number of symbols received by the error correction module 420). In embodiments, the error adjustment module 435 calculates an error correction value when a correct slicer error is received from the correct slicer error module 425 or an estimated slicer error is received from the estimated slicer error module 430.

In embodiments, the error adjustment module 435 accepts slicer errors from a slicer error module 415. The error adjustment module 435 can calculate an average slicer error by summing together received slicer errors and dividing the slicer error sum by the number of slicer errors received. For example, the error adjustment module 435 can maintain a sum of slicer error measurements and can maintain a count of the number of received symbols. It should be understood that a sum of slicer error measurements and a count of a number of received symbols can be stored by other components or at other locations. In embodiments, an average slicer error is calculated for symbols measured over various signal components or durations (e.g., an average MER of a burst, channel, physical card, etc.). It should be understood that an average slicer error can be calculated for symbols within an individual signal or symbols associated with a plurality of signals. In embodiments, the error adjustment module 435 sums together average slicer errors and average error correction values to generate an average symbol error. For example, the average symbol error can be a measure of the level of energy associated with an average difference between a received symbol and a correct symbol. In embodiments, the error adjustment module 435 outputs the average symbol error to an MER module 440.

In embodiments, an MER module 440 calculates an MER associated with the input signal 445. For example, an MER module 440 can calculate MER of a symbol and/or an average MER value of symbols measured over various signal components or durations (e.g., an average MER of a burst, channel, physical card, etc.). In embodiments, the MER is computed by taking the logarithmic function of the quotient obtained from dividing the average symbol error by an average constellation power associated with a QAM modulation order. In embodiments, the calculated MER is used as an estimate of the signal to noise ratio (SNR) existing on a channel.

Figure 5:
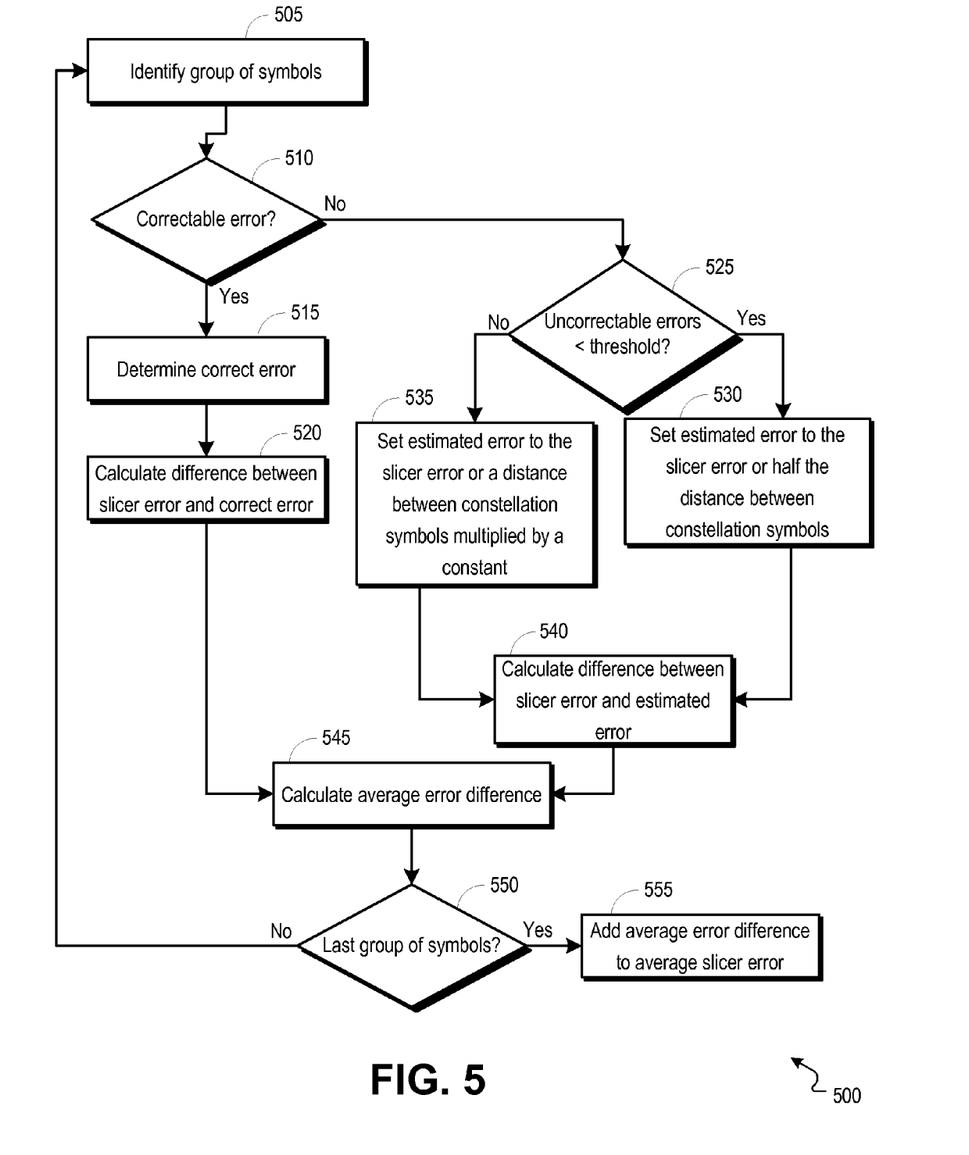
FIG. 5 is a flowchart illustrating an example process operable to calculate modulation error ratio using feedback from error correction processing.

FIG. 5 is a flowchart illustrating an example process 500 operable to calculate the modulation error ratio at a receiver using feedback from error correction processing. The process 500 can begin at 505 when a symbol associated with a signal is identified, the identified symbol being a symbol that is to be passed to an error correction module (e.g., correct slicer error module 425 of FIG. 4 or estimated slicer error module 430 of FIG. 4). A symbol can be identified, for example, by an error correction module 420 of FIG. 4. In embodiments, the identified symbol is a symbol that has a translation error (e.g., the correct symbol associated with a received symbol is not the constellation symbol closest to the received symbol) or is part of a group of symbols that contains one or more uncorrectable errors.

At 510, a determination can be made whether one or more symbols within a group of symbols are correctable. The determination whether one or more symbols within the group of symbols are correctable can be made, for example, by an error correction module 420 of FIG. 4. For example, the determination can be made that one or more symbols within a group of symbols are correctable where the number of erroneous symbols within the group of symbols is less than a maximum number of symbols that can be corrected.

If, at 510, the determination is made that one or more symbols within the group of symbols are correctable, the process 500 can proceed to 515. At 515, a correct error corresponding with each of the correctable symbols within the group of symbols can be determined. A correct error corresponding with the correctable symbols can be determined, for example, by a correct slicer error module 425 of FIG. 4. In embodiments, a correct error is calculated by taking the difference between the received symbol and a correct constellation symbol corresponding with the received symbol. In embodiments, the correct constellation symbol is identified based upon a QAM modulation order associated with the input signal containing the received symbol. The correct constellation symbol can be identified based upon information obtained from the received symbol or information received from other components or devices.

At 520, an error correction value can be calculated by taking the difference between the slicer error associated with the identified symbol and a correct error associated with the identified symbol. The difference between a slicer error and a correct error can be calculated, for example, by an error adjustment module 435 of FIG. 4. In embodiments, the difference between the slicer error and a correct error is calculated by taking the difference between the energy of the slicer error and the energy of a correct error associated with the slicer error.

Returning to 510, if the determination is made that one or more symbols within the group of symbols are uncorrectable, the process 500 can proceed to 525. At 525, a determination can be made whether the number of uncorrectable symbols within the group of symbols received (e.g., received by an estimated slicer error module 430 of FIG. 4) is less than a predetermined threshold. In embodiments, the predetermined threshold can be associated with a predetermined period of time, over which a count of the number of uncorrectable symbols within the group of symbols received is maintained. The determination whether the number of uncorrectable symbols within the group of symbols received is less than a predetermined threshold can be made, for example, by an estimated slicer error module 430 of FIG. 4. In embodiments, a count of the number of uncorrectable symbols within the group of symbols received is maintained. For example, the estimated slicer error module 430 of FIG. 4 can maintain a count of the number of uncorrectable symbols within the group of symbols received, and can compare the count to a predetermined threshold.

If, at 525, the determination is made that the number of uncorrectable symbols within the group of symbols received is less than a predetermined threshold, the process 500 can proceed to 530. At 530, an estimated error can be set to the slicer error associated with the uncorrectable symbol or half the horizontal or vertical distance between symbols in a constellation diagram associated with the received symbol. The estimated error can be set, for example, by an estimated slicer error module 430 of FIG. 4. In embodiments, where the number of uncorrectable symbols within the group of symbols is less than the predetermined threshold, the estimated error is set to the greater of the slicer error associated with the uncorrectable symbol or one-half of the horizontal and/or vertical distance between two adjacent symbols in a constellation diagram associated with the received symbol. When the number of uncorrectable symbols within a group of symbols is low, errors are likely to occur in adjacent symbols (e.g., the errors are likely to occur in a symbol that is relatively near a correct symbol within a constellation diagram). Therefore, when the number of uncorrectable symbols within a group of symbols is low, one-half of the horizontal and/or vertical distance between two adjacent constellation symbols can be an accurate approximation of an error.

Returning to 525, if the determination is made that the number of uncorrectable symbols within a group of symbols is not less than a predetermined threshold, the process 500 can proceed to 535. At 535, an estimated error can be set to the slicer error associated with the uncorrectable symbol or a distance between symbols in a constellation diagram associated with the received symbol multiplied by a constant. The estimated error can be set, for example by an estimated slicer error module 430 of FIG. 4. In embodiments, where the number of uncorrectable symbols within the group of symbols is not less than the predetermined threshold, the estimated error is set to the greater of the slicer error associated with the uncorrectable symbol or a constant multiplied by the horizontal and/or vertical distance between two adjacent symbols in a constellation diagram associated with the received symbol. The constant can be determined based upon the predetermined threshold, a desired or expected difference between a received symbol and a corresponding estimated symbol, or based upon the quadrature amplitude modulation order of the group of symbols.

At 540, the difference between the slicer error associated with the uncorrectable symbol and the estimated error can be calculated. The difference between the slicer error and the estimated error can be calculated, for example, by an error adjustment module 435 of FIG. 4. In embodiments, the difference between the slicer error and the estimated error is calculated by taking the difference between the energy of the slicer error and the energy of an estimated error associated with the slicer error.

At 545, an average error correction value for the group of symbols can be calculated. An average error correction value can be calculated, for example, by an error adjustment module 435 of FIG. 4. In embodiments, the error adjustment module 435 receives one or more error correction values (e.g., the difference between a slicer error and a correct error, the difference between a slicer error and an estimated error) from a correct slicer error module 425 and/or an estimated slicer error module 430. The error adjustment module 435 can sum received error correction values. For example, the error adjustment module 435 can sum together all of the received error correction values for a group of symbols, and the error adjustment module 435 can maintain a count of the number of received error correction values for the group of symbols. In embodiments, the error adjustment module 435 divides a sum of the received error correction values by the number of symbols in a group of symbols to calculate an average error correction value for the group of symbols.

At 550, a determination can be made whether the identified group of symbols is the last group of symbols. The determination whether the identified group of symbols is the last group of symbols can be made, for example, by an error correction module 420 of FIG. 4. If the determination is made that the identified group of symbols is not the last group of symbols, the process 500 can return to 505 where a next group of symbols can be identified.

If, at 550, the determination is made that the identified group of symbols is the last group of symbols, the process 500 can proceed to 555. At 555, the average error correction value can be added to an average slicer error. The average error correction value can be added to an average slicer error, for example, by an error adjustment module 435 of FIG. 4. In embodiments, an average slicer error associated with a group of symbols is calculated by the error adjustment module 435 or a slicer error module 415 of FIG. 4. For example, the average slicer error can be an average of the differences between received symbols and corresponding sliced symbols (e.g., a constellation symbol that is closest to the received symbol). An average symbol error that accounts for error correction feedback can be calculated by adding the average error correction value to the average slicer error. In embodiments, the average symbol error is used to calculate an MER associated with the group of symbols.

Figure 6:
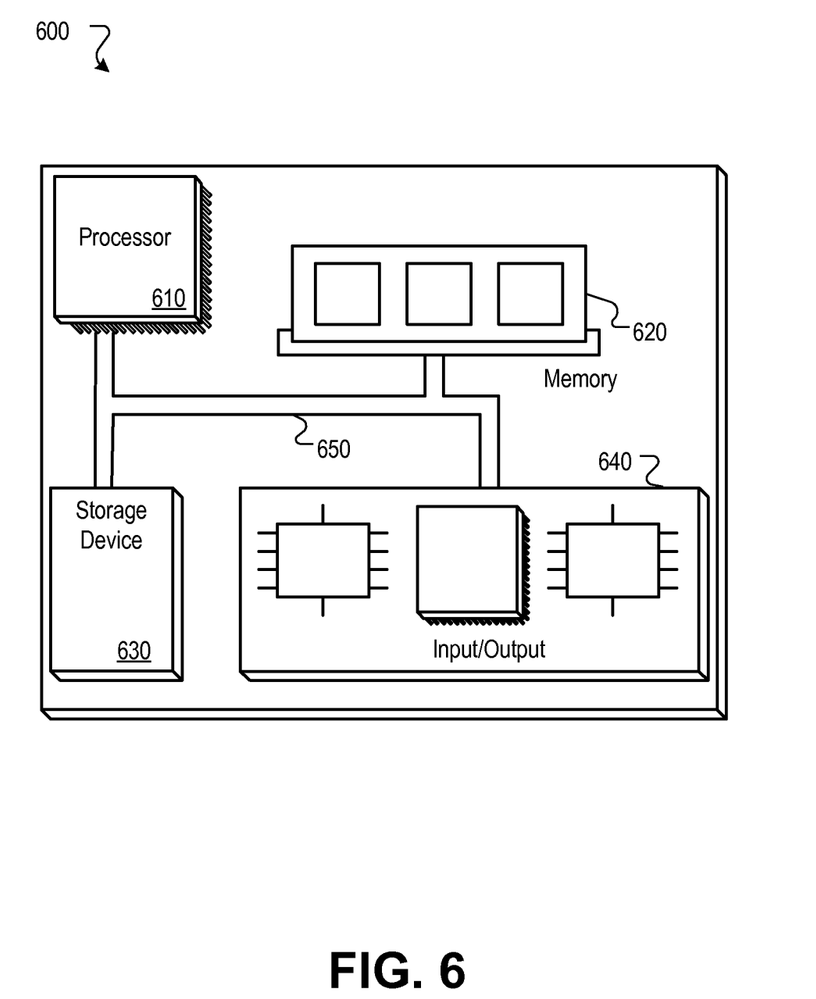
FIG. 6 is a block diagram of a hardware configuration operable to calculate modulation error ratio using feedback from error correction processing.

FIG. 6 is a block diagram of a hardware configuration 600 operable to calculate modulation error ratio using feedback from error correction processing. It should be understood that various kinds of devices can operate to calculate modulation error ratio using feedback from error correction processing. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., subscriber network 120 of FIG. 1, network(s) 125 of FIG. 1, etc.).

Those skilled in the art will appreciate that the invention improves upon methods and apparatuses for calculating MER. The methods, systems, and apparatuses described in this disclosure enable the calculation of MER using feedback from error correction processing.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a group of symbols;
   determining an average slicer error for the group of symbols, the slicer error of each received symbol within the group of symbols being the difference between the received symbol and a corresponding sliced symbol;
   determining an average error correction value for the group of symbols, the error correction value for each received symbol within the group of symbols being the difference between the slicer error associated with the received symbol and an actual error associated with the received symbol;
   combining the average error correction value with the average slicer error; and
   determining a modulation error ratio associated with the group of symbols based on the combination of the average error correction value and the average slicer error.

2. The method of claim 1, wherein determining an error correction value for a received symbol comprises:
   determining whether the received symbol is correctable; and
   where the received symbol is correctable:
      determining a correct symbol associated with the received symbol; and
      determining the actual error associated with the received symbol, the actual error being the difference between the received symbol and the correct symbol associated with the received symbol.

3. The method of claim 1, wherein determining an error correction value for a received symbol comprises:
   determining whether the received symbol is correctable; and
   where the received symbol is not correctable, determining an estimated error.

4. The method of claim 3, further comprising:
   determining whether a number of uncorrectable symbols within the received group of symbols is less than a threshold; and
   where the number of uncorrectable symbols within the received group of symbols is less than the threshold, determining the estimated error to be the greater of the slicer error associated with the received symbol or one-half of the distance between adjacent constellation symbols within a constellation diagram associated with the received symbol.

5. The method of claim 3, further comprising:
   determining whether the number of uncorrectable symbols within the received group of symbols is less than a threshold; and
   where the number of uncorrectable symbols within the received group of symbols is not less than the threshold, determining the estimated error to be the greater of the slicer error associated with the received symbol or the product of a constant multiplied by the distance between adjacent constellation symbols within a constellation diagram associated with the received symbol.

6. The method of claim 5, wherein the constant is determined based upon a quadrature amplitude modulation order associated with the received group of symbols.

7. The method of claim 1, wherein determining an error correction value for a received symbol comprises:
   determining that a number of errored symbols in the received group of symbols is less than a maximum number of symbols that can be corrected;
   determining a correct symbol associated with the received symbol; and
   determining the actual error associated with the received symbol, the actual error being the difference between the received symbol and the correct symbol associated with the received symbol.

8. The method of claim 1, wherein determining an average error correction value for a group of symbols comprises:
   determining that a number of errored symbols in the received group of symbols is greater than a maximum number of symbols that can be corrected; and
   determining an estimated error that is to be applied to each of the uncorrectable symbols within the group of symbols.

9. An apparatus comprising:
   an input interface configured to be used to receive a group of symbols;
   a slicer module configured to determine an average slicer error for the group of symbols, the slicer error of each received symbol within the group of symbols being the difference between the received symbol and a corresponding sliced symbol;
   an error correction module configured to:
      determine an actual error associated with a received symbol; and
      determine an average error correction value for the group of symbols, the error correction value for each received symbol within the group of symbols being the difference between the slicer error associated with the received symbol and the actual error associated with the received symbol;

a combiner module configured to combine the average error correction value with the average slicer error; and a calculation module configured to determine a modulation error ratio associated with the group of symbols based on the combination of the average error correction value and the average slicer error.

10. The apparatus of claim 9, wherein the error correction module is configured to determine the error correction value for a received symbol by:

determining whether the received symbol is correctable; and where the received symbol is correctable:
   determining a correct symbol associated with the received symbol; and
   determining the actual error associated with the received symbol to be equivalent to the difference between the received symbol and the correct symbol associated with the received symbol.

11. The apparatus of claim 9, wherein the error correction module is configured to determine the error correction value for a received symbol by:

determining whether the received symbol is correctable; and where the received symbol is not correctable, determining an estimated error.

12. The apparatus of claim 11, further comprising:

determining whether a number of uncorrectable symbols within the received group of symbols is less than a threshold; and where the number of uncorrectable symbols within the received group of symbols is less than the threshold, determining the estimated error to be the greater of the slicer error associated with the received symbol or one-half of the distance between adjacent constellation symbols within a constellation diagram associated with the received symbol.

13. The apparatus of claim 11, further comprising:

determining whether a number of uncorrectable symbols within the received group of symbols is less than a threshold; and where the number of uncorrectable symbols within the received group of symbols is not less than the threshold, determining the estimated error to be the greater of the slicer error associated with the received symbol or the product of a constant multiplied by the distance between adjacent constellation symbols within a constellation diagram associated with the received symbol.

14. The apparatus of claim 13, wherein the constant is determined based upon a quadrature amplitude modulation order associated with the received group of symbols.

15. One or more non-transitory computer readable media having instructions operable to cause one or more processors to perform the operations comprising:

receiving a group of symbols;

determining an average slicer error for the group of symbols, the slicer error of each received symbol within the group of symbols being the difference between the received symbol and a corresponding sliced symbol;

determining an average error correction value for the group of symbols, the error correction value for each received symbol within the group of symbols being the difference between the slicer error associated with the received symbol and an actual error associated with the received symbol;

combining the average error correction value with the average slicer error; and determining a modulation error ratio associated with the group of symbols based on the combination of the average error correction value and the average slicer error.

16. The one or more non-transitory computer-readable media of claim 15, wherein determining an error correction value for a received symbol comprises:

determining whether the received symbol is correctable; and where the received symbol is correctable:
   determining a correct symbol associated with the received symbol; and
   determining the actual error associated with the received symbol, the actual error being the difference between the received symbol and the correct symbol associated with the received symbol.

17. The one or more non-transitory computer-readable media of claim 15, wherein determining an error correction value for a received symbol comprises:

determining whether the received symbol is correctable; and where the received symbol is not correctable, determining an estimated error.

18. The one or more non-transitory computer-readable media of claim 17 having instructions further operable to cause one or more processors to perform the operations comprising:

determining whether the number of uncorrectable symbols within the received group of symbols is less than a threshold; and where the number of uncorrectable symbols within the received group of symbols is less than the threshold, determining the estimated error to be the greater of the slicer error associated with the received symbol or one-half of the distance between adjacent constellation symbols within a constellation diagram associated with the received symbol.

19. The one or more non-transitory computer-readable media of claim 17 having instructions further operable to cause one or more processors to perform the operations comprising:

determining whether the number of uncorrectable symbols within the received group of symbols is less than a threshold; and where the number of uncorrectable symbols within the received group of symbols is not less than the threshold, determining the estimated error to be the greater of the slicer error associated with the received symbol or the product of a constant multiplied by the distance between adjacent constellation symbols within a constellation diagram associated with the received symbol.

20. The one or more non-transitory computer-readable media of claim 19, wherein the constant is determined based upon a quadrature amplitude modulation order associated with the received group of symbols.

* * * * *